(12) United States Patent
Pajukoski et al.

(10) Patent No.: US 7,349,463 B1
(45) Date of Patent: Mar. 25, 2008

(54) METHOD AND APPARATUS FOR PERFORMING INTERFERENCE ESTIMATION

(75) Inventors: Kari Pajukoski, Oulu (FI); Kari Horneman, Oulu (FI); Pasi Kinnunen, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/009,127

(22) PCT Filed: Jun. 11, 1999

(86) PCT No.: PCT/EP99/04053

§ 371 (c)(1),
(2), (4) Date: Apr. 29, 2002

(87) PCT Pub. No.: WO00/77946

PCT Pub. Date: Dec. 21, 2000

(51) Int. Cl.
*H04B 1/00* (2006.01)
(52) U.S. Cl. .................................................. 375/148
(58) Field of Classification Search ................ 375/148, 375/316, 346, 350; 455/69, 504, 505, 522; 702/179; 708/806
See application file for complete search history.

(56) References Cited

U.S. PATENT DOCUMENTS

| | | | | |
|---|---|---|---|---|
| 5,297,161 A | * | 3/1994 | Ling | ............................ 375/130 |
| 5,379,324 A | * | 1/1995 | Mueller et al. | .............. 375/340 |
| 6,067,333 A | * | 5/2000 | Kim et al. | ................... 375/346 |
| 6,377,607 B1 | * | 4/2002 | Ling et al. | ................... 375/130 |
| 6,381,229 B1 | * | 4/2002 | Narvinger et al. | ........... 370/328 |
| 6,661,777 B1 | * | 12/2003 | Blanc et al. | ................. 370/252 |
| 6,717,995 B2 | * | 4/2004 | Zvonar | ........................ 375/340 |

FOREIGN PATENT DOCUMENTS

EP 0 776 105 A1 5/1997

OTHER PUBLICATIONS

F. Adachi et al., "Tree-structured generation of orthogonal spreading codes with different lengths for forward link of DS-CDMA mobile radio", Electronics Letters, Jan. 2, 1997, vol. 33 No. 1, p. 27-28.

* cited by examiner

*Primary Examiner*—Sam K. Ahn
(74) *Attorney, Agent, or Firm*—Harrington & Smith, PC

(57) ABSTRACT

The present invention relates to a method and apparatus for performing an interference estimation in a spread spectrum system using a plurality of spreading codes with different code lengths, wherein the interference estimate is obtained based on a variance estimate of despread samples integrated over a predetermined code period over which said plurality of spreading codes are orthogonal. Thereby, an unbiased interference estimation with high accuracy and proper consideration of code orthogonality can be obtained.

45 Claims, 3 Drawing Sheets

METHOD AND APPARATUS FOR PERFORMING INTERFERENCE ESTIMATION

PRIORITY CLAIM

This is a national stage of PCT application No. PCT/EP99/04053, filed on Jun. 11, 1999. Priority is claimed on that application.

FIELD OF THE INVENTION

The present invention relates to a method and apparatus for performing an interference estimation in a spread spectrum system, such as a WCDMA system, using a plurality of spreading codes with different code lengths.

BACKGROUND OF THE INVENTION

In spread-spectrum systems like the WCDMA system, the spectrum is spread by introducing additional modulation with spectrum spreading (SS) codes. An SS code is a sequence consisting of so-called chips. Orthogonal code sequences are used for the SS codes, whose characteristics vary depending on the purpose of the system. With multiplication of a PN (SS) code with the data signal, the spectrum spreads according to the spectrum bandwidth of the SS code. The multiplication with the PN code in the time domain results in a convolution integral in the frequency domain. If an SS code with a length of N chips for each data symbol is used, then the chip rate of the SS code is N times the data rate. As a result, the spectral bandwidth is increased (spread) by N times the original data spectral bandwidth.

In practice, a (mobile) radio channel is subjected to multipath fading. In this channel, a narrow-band signal experiences flat fading, where all frequency components of the signal drop by the same amount at the same time. As a result, signal level may drop below the threshold value for adequate communication. As the signal bandwidth becomes comparable to or wider than the coherence bandwidth of the multipath channel, the signal experiences frequency-selective fading and the signal level seldom drops below the threshold value, which is an advantage for the wide band signal.

An SS system offers a simple technique that is effective in mitigating the multipath fading. This technique is called a RAKE receiver and uses a filter matched to the channel transfer characteristics. The matched filter in the RAKE receiver outputs, at the sampling instant, a signal obtained by coherently combining the multipath signal components. Since the multipath signal components are subjected to independent fading, the combined signal has a diversity gain. Owing to the high time resolution, an SS system yields the channel impulse response necessary for the matched filter (RAKE) receiver. Thus, the SS RAKE receiver achieves the benefit of wide-band transmission with low effort.

In a mobile communication system, an uplink closed loop power control is used for adjusting a mobile station transmit power in order to keep the received uplink Signal-to-Interference Ratio (SIR) at a given SIR target. The base station is arranged to estimate the total uplink received interference in the current frequency band. The base station then generates TPC (Transmit Power Control) commands according to the relationship between the estimated SIR and the target SIR. If the estimated SIR is larger than the target SIR, then a TPC command "down" is generated. If the estimated SIR is smaller than the target SIR, then a TPC command "up" is generated. Upon reception of a TPC command, the mobile station adjusts its transmit power in the given direction with a step of $\Delta_{TPC}$ dB. The step size $\Delta_{TPC}$ is a parameter that may differ between different cells.

In WCDMA systems, interference estimation methods can be divided into two classes according to the location of an interference estimator in the RAKE receiver.

If the interference estimator is located before despreading of the received SS signal, it is based on a wide band power measurement. In this kind of solution, the signal plus interference power is measured from the wide band signal, and an interference estimate is then performed by subtracting the signal power from the measured wide band power. However, the subtraction of the signal power is a problem in the WCDMA system, because the data rate might not be known, such that it is difficult to estimate the signal power. Furthermore, this kind of interference estimation does not properly takes an orthogonality of the spreading codes into consideration.

Alternatively, the interference estimator can be located after despreading the received SS signal. In this case, the interference estimation is based on a variance estimation performed at the symbol level. The variance is measured over known symbols assuming that the WCDMA channel is nearly constant during a measuring period. In this kind of estimation, a change of the orthogonality is tracked in the right way. However, due to a small number of known symbols, the variance of that kind of estimator is high. Moreover, fast fading is a problem of this kind of estimation, since changes of the WCDMA channel during the estimation period may degrade the interference estimation.

SUMMARY OF THE INVENTION

It is therefore an object of the present invention to provide a method and apparatus for performing an interference estimation, which provide an improved estimation accuracy and properly consider code orthogonalities.

This object is achieved by a method for performing an interference estimation in a spread spectrum system using a plurality of spreading codes with different code lengths, comprising the steps of:

receiving a spread spectrum signal;

generating a despread sample signal by averaging over a predetermined code period over which said plurality of spreading codes are orthogonal; and calculation a variance estimate based on said despread sample signal.

Additionally, the above object is achieved by an apparatus for performing an interference estimation in a spread spectrum system using a plurality of spreading codes with different code lengths, comprising:

receiving means for receiving a spread spectrum signal;
sampling means for generating a despread sample signal by averaging over a predetermined code period over which said plurality of spreading codes are orthogonal; and estimation means for obtaining a variance estimate based on said despread sample signal.

Accordingly, the interference estimate can be obtained based on a variance estimator of despread samples integrated over a code period having a length over which all spreading codes are orthogonal. Thus, even if different signals of the WCDMA system are despread by spreading codes with different spreading factors, the interference estimation is performed on the basis of an orthogonal code period relating to a code segment from which all other codes are built. Since each despread sample corresponds to an orthogonal code period, the interference estimation may properly distinguish orthogonalities. Since more samples are used for the estimation, a higher accuracy is obtained as compared to an estimation based on the symbol level. Moreover, the accuracy of estimation is not dependent on the number of known pilot symbols, because the method and apparatus according to the present invention can be used with unknown symbols.

In view of the fact that one variance estimate can be performed during one control symbol, changes of the corresponding radio channel have less influence as compared to a symbol level based estimation where one variance estimate is performed during many symbols. Furthermore, the interference estimate can be performed even if the spreading factor or power of different code channels is unknown, which is not possible if the interference is estimated by a wideband power measurement.

Preferably, the variance estimate is calculated by averaging the despread sample signal of the spreading code length of the received spread spectrum signal.

The predetermined code period preferably corresponds to the length of the shortest code of the plurality of spreading codes.

The variance estimate may be an MVU (Minimum Variance Unbiased) calculated by using the equation $$\hat{\sigma}^2(i) = E(|X|^2) - |E(X)|^2$$

wherein $\hat{\sigma}^2$ (i) denotes the variance estimate for a symbol i of said received spread spectrum signal, X denotes the despread sample signal, E(X) denotes an expectation value for the despread sample signal, and $E(|X|^2)$ denotes the mean power of said despread sample signal.

The expectation value for variance estimate is expressed by $$E(\hat{\sigma}^2) = \frac{p}{p+1}\sigma^2$$

where p denotes the number of samples used in the estimation.

The despread sample signal may be generated based on the equation $$X(n) = \frac{1}{m}\sum_{k=1}^{m} r(k)$$

Wherein m denotes the number of chips of the predetermined code period and is a value proportional to the minimum code length, k denotes a chip index of a spreading code of said received spectrum signal, r (k) denotes the value of a signal, obtained by removing said spreading code from said received spread spectrum signal, at said chip index k, and wherein X (n) denotes the value of said despread sample signal at a sample index n.

Furthermore, the expectation value may be obtained based on the equation $$E(X) = \frac{1}{c/m}\sum_{n=1}^{c/m} X(n)$$

wherein c is a value proportional to the spreading code length of said received spread spectrum signal, m denotes the number of chips of said predetermined code period and is a value proportional to the minimum code length, n denotes a sample index of said despread sample signal, and X (n) denotes the value of said despread sample signal at the sample index n.

Furthermore, the mean power of the despread sample signal may be obtained based on the equation $$E(|X|^2) = \frac{1}{c/m}\sum_{n=1}^{c/m} |X(n)|^2$$

wherein c denotes the spreading code length of said received spread spectrum signal, c is a value proportional to the spreading code length of said received spread spectrum signal, m denotes the number of chips of said predetermined code period and is a value proportional to the minimum code length, n denotes a sample index of said despread sample signal, and X (n) denotes the value of said despread sample signal at the sample index n.

Preferably, the interference estimation may be obtained based on the equation $$\hat{I} = m\frac{c+m}{c} \cdot \frac{1}{N}\sum_{i=1}^{N} I(i)$$

wherein I denotes the interference estimate, m denotes the number of chips of said predetermined code period, N denotes the number of averaged symbols of said received spread spectrum signal, for which said variance estimation is performed.

Furthermore, the mean power of the despread sample signal may be obtained based on the equation $$E(|X^2|) = \frac{1}{c/m}\sum_{n=1}^{c/m} |X(n)|^2$$

wherein c denotes the spreading code length of said received spread spectrum signal, m denotes the number of chips of said predetermined code period, n denotes a sample index of said despread sample signal, and X(n) denotes the value of said despread sample signal at the sample index n.

Preferably, the interference estimation may be obtained based on the equation $$\hat{I} = m\frac{c+m}{c} \cdot \frac{1}{N}\sum_{i=1}^{N} I(i)$$

wherein $\hat{I}$ denotes the interference estimate, m denotes the number of chips of said predetermined code period, N denotes the number of averaged symbols of said received spread spectrum signal, for which said variance estimation is performed.

The sampling means of the interference estimation apparatus may comprise an integrating means for integrating a signal, obtained by removing a spreading code from the received spread spectrum signal, over the predetermined code period.

Furthermore, the estimation means of said interference estimation apparatus may comprise a first integrating means for integrating the despread sample signal over a spreading code length of the received spread spectrum signal, a second integrating means for integrating a signal corresponding to the power of the despread sample signal over said spreading code length, and subtracting means for subtracting a signal obtained by squaring an output signal of the first integrating means from an output signal of the second integrating means.

Furthermore, the estimation means may comprise an averaging means for averaging an output signal of the subtracting means over a predetermined number of symbols of the received spread spectrum signal. In this case the averaging means may comprise an integrating means or, alternatively, a digital filter.

The interference estimation apparatus may be an SIR estimator used for performing power control in a WCDMA transceiver.

BRIEF DESCRIPTION OF THE DRAWINGS

In the following, the present invention will be described in greater detail on the basis of a preferred embodiment with reference to the accompanying drawings, in which.

DESCRIPTION OF THE PREFERRED EMBODIMENT

The preferred embodiment of the method and apparatus according to the present invention will be described on the basis of a WCDMA transceiver which may be used in a base station of a mobile communication system.

Figure 1:
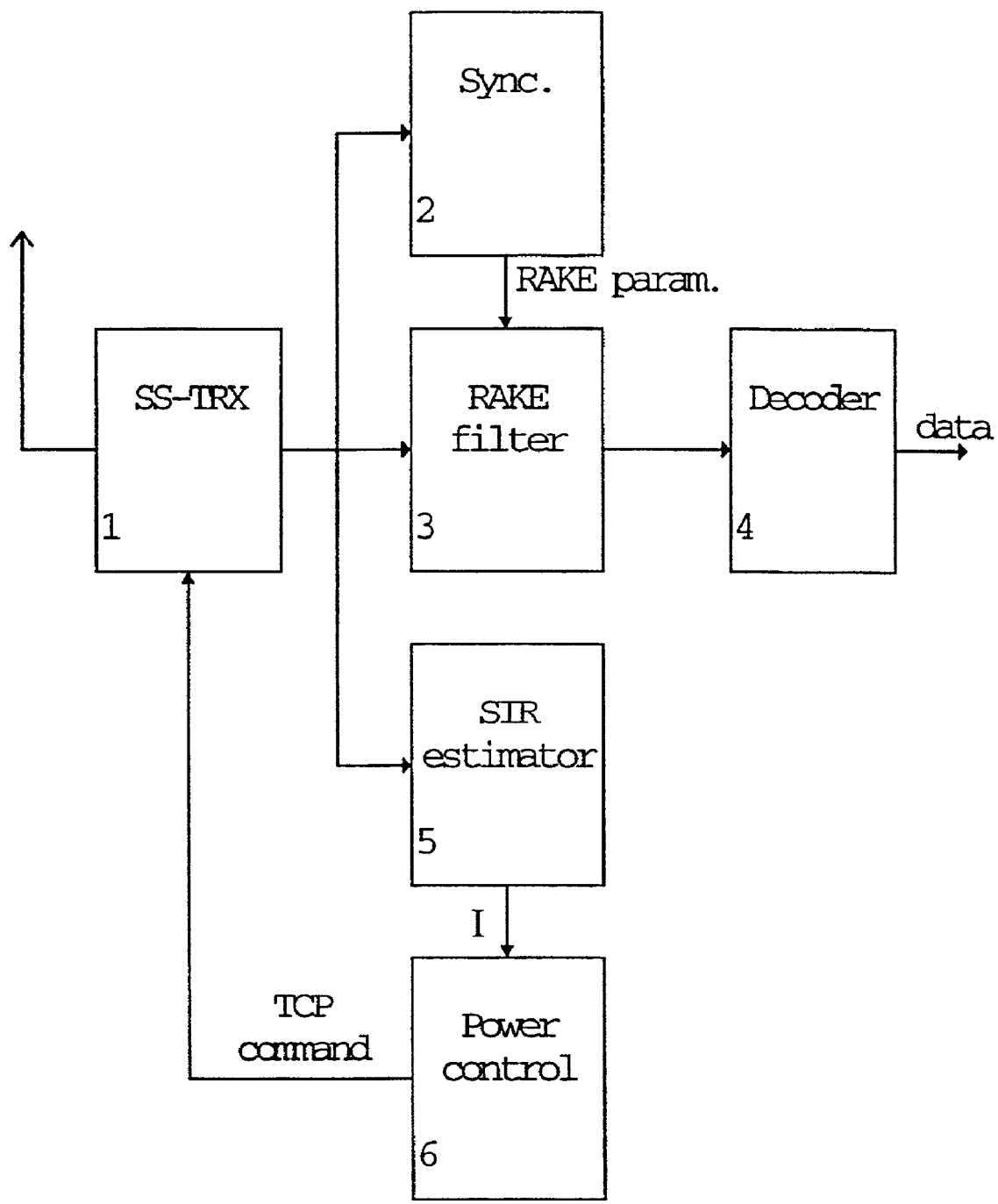
FIG. 1 shows a principle block diagram of a WCDMA transceiver in which an interference estimation according to the preferred embodiment of the present invention is applied.

FIG. 1 shows a principle block diagram of a WCDMA transceiver comprising a spread spectrum transceiver (SS-TRX) 1 for supplying a received SS signal to each one of a synchronization unit 2, a RAKE filter 3, and an SIR estimator 5 according to the present invention. The synchronization unit 2 basically comprises matched filters used to synchronize on a transmission by transmission basis. The synchronization unit 2 generates RAKE parameters supplied to the RAKE filter 3 so as to adapt the filter characteristic thereof to the channel characteristic of the transmission channel of the received SS signal. The output signal of the RAKE filter 3 is supplied to a decoder 4 used for decoding the received signal e.g. with respect to a scrambling code used in the WCDMA transmission.

The SIR estimator 5 according to the present invention is arranged to perform a variance estimation of an interference of a power control signal included in the received SS signal. The estimated SIR value I obtained in the SIR estimator 5 is supplied to a power control unit 6 arranged to generate respective TCP commands used for performing a power control at a respective transmitting mobile station. The generated TCP commands are transmitted by the SS-TRX 1 to the respective mobile station.

According to the preferred embodiment, a multi-code transmission is performed, wherein a plurality of spreading codes (channelization codes) are used for the WCDMA transmission. The channelization codes are Orthogonal Variable Spreading Factor (OVSF) codes, which can be defined using a code tree. Each level in the code tree defines channelization codes of a code length corresponding to a spreading factor of the spreading code. However, all codes within the code tree cannot be used simultaneously. A code can be used if and only if no other code on the path from the specific code to the root of the code tree or in the sub-tree below the specific code is used. This means that the number of available channelization codes is not fixed but depends on the rate and spreading factor of each physical channel.

Thus, signals with different data rates are despread by spreading codes with different spreading factors. The shortest codes in the code tree are known and all other codes are built from them. In practice, when a code length is not known to the receiver, the despreading is initially performed according to the shortest code (minimal spreading factor). In this condition, all codes must be orthogonal over the length of the shortest code period. Thus, the interference estimate can be performed based on a variance estimator of despread samples averaged or integrated over the orthogonal code period, e.g. the shortest existing code period.

Figure 2:
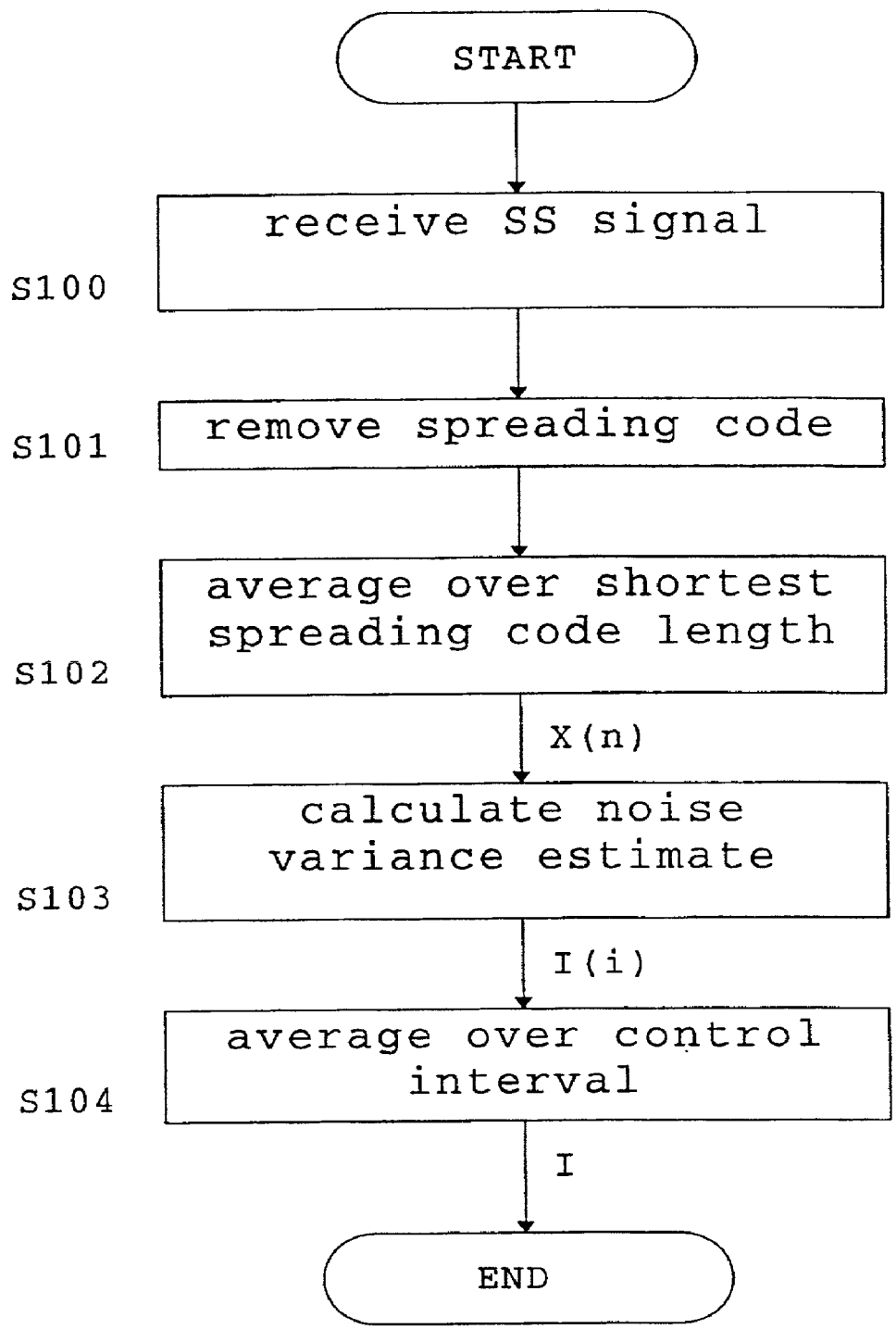
FIG. 2 shows a flow diagram of the principle steps of the interference estimation method according to the preferred embodiment.

FIG. 2 shows a flow diagram of the basic steps of the interference estimation according to the preferred embodiment. In Step S100 an SS signal is received by the SIR estimator 5 from the SS-TRX 1. Then, the spreading code is removed in step S101, e.g. by multiplying the received SS signal with the spreading code of the power control channel.

Subsequently, the obtained signal is averaged over the code length of the shortest spreading code, i.e. the orthogonal code period of all spreading codes used in the WCDMA system. Thereby, a sample signal X (n) is obtained, which properly reflects the orthogonal components of the received signal components. The average may be obtained based on the following equation $$X(n) = \frac{1}{m}\sum_{k=1}^{m} r(k)$$

wherein m is a value proportional to the length of the shortest code period in which the shortest code period is expressed by the number m of chips multiplied by the time duration τ of one chip of the spreading code, k denotes a chip index, n denotes an index of samples integrated over the shortest code length, and X (n) denotes a value of the obtained despread sample signal at the sample index n.

Thereafter, an interference estimate I(i) for a control symbol i is estimated based on a noise variance estimation of the despread sample signal (step S103). Assuming that the interference in the transmission channel corresponds to Additive White Gaussian Noise (AWGN), the optimum estimator for the interference is the MVU (Minimum Variance Unbiased) defined by the following equation (2)

$$\hat{\sigma}^2 = E(|X - E(X)|^2) \quad (2)$$

wherein E(X) denotes an expectation value of the value X.

According to "Fundamentals of Statistic Signal Processing: Estimation Theory" by S. M. Kay, Prentice Hall, 1993, the above equation (2) can be reduced to $$\hat{\sigma}^2 = E(|X|^2) - |E(X)|^2 \quad (3)$$

i.e. the interference estimator can be obtained by subtracting the square of an expectation value of a sample X from an expectation value of the mean power of samples of x.

The expectation value for the variance estimate is expressed by $$E(\hat{\sigma}^2) = \frac{p}{p+1}\sigma^2 \quad (4)$$

where p denotes the number of samples used in the estimation.

Finally, the interference estimate calculated according to the above equation (3) is averaged over a predetermined control interval (step S104) so as to obtain a final interference estimate used as the SIR estimator supplied to the power control unit 6. In particular, the predetermined control interval corresponds to a predetermined number of averaged control symbols.

The expectation value of the sample X and the mean power of samples of X used for calculating the interference estimate in stepS103 can be obtained from the following equations (5) and (6):

$$E(X) = \frac{1}{c/m}\sum_{n=1}^{c/m} X(n)$$

$$E(|X|^2) = \frac{1}{c/m}\sum_{n=1}^{c/m} |X(n)|^2$$

wherein c is a value proportional to the length of the spreading code of the received control signal, i.e. control channel.

wherein c denotes the length of the spreading code of the received control signal, i.e. control channel.

Furthermore, the averaging performed in step S104 can be obtained on the basis of the following equation (7):

$$\hat{I} = m\frac{c+m}{c} \cdot \frac{1}{N}\sum_{i=1}^{N} I(i) \quad (7)$$

wherein Î denotes the final interference estimate, N denotes the number of average symbols, I(i) denotes the interference estimate for a control symbol i.

The above calculations can be performed by a signal processor, averaging circuits or integrating circuits. The final averaging based on the equation (7) can be performed by integrating over a TPC control interval. Alternatively, the averaging can be performed by a digital filter such as an IIR (Infinite Impulse Response) filter.

Figure 3:
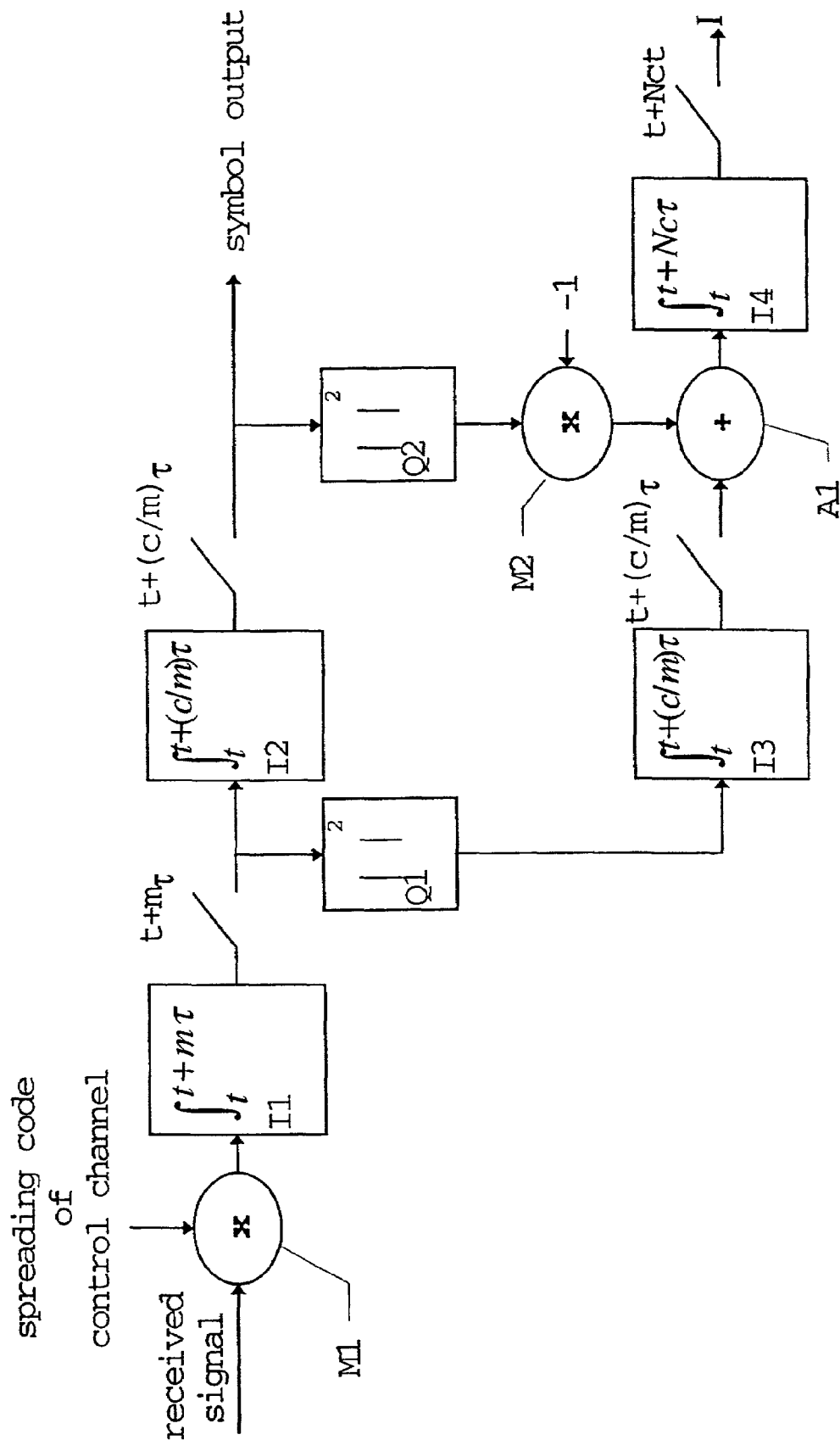
FIG. 3 shows a principle block diagram of an interference estimator according to the preferred embodiment of the present invention.

FIG. 3 shows a principle block diagram of the SIR estimator 5 shown in FIG. 1. The specific components of this block diagram may be achieved by corresponding signal processing functions in a signal processor or by discrete hardware circuits.

According to FIG. 3, the received SS signal including the power control symbols is supplied to a multiplier M1 arranged to multiply the received SS signal by the spreading code used in the power control channel. Thereby, the spreading code is removed from the received SS signal. Then, the obtained signal from which the spreading code has been removed is supplied to a first integrator I1 which performs an integration over the shortest code length mτ, wherein τ denotes the time duration of one chip of the spreading code and m denotes the number of chips of the predetermined code period for a shortest code length. At the output of the integrator I1, a switch is provided which is closed at the timing t+mT, so as to perform a sample operation of the integrated output signal at the end of the integration period. The obtained despread sample signal is supplied to a second integrator I2 and a first squaring unit Q1 for obtaining a square of the absolute value of the sample signal.

The second and third integrators I2 and I3 are arranged to integrate the sample signal and the mean power signal, respectively, over a time period (c/m)τ corresponding to the length of the spreading code of the control channel. At the outputs of the second and third integrators I2 and I3 respective switches are provided, which perform a sample operation of the output signals at a timing t+(c/m)τ, so as to obtain an output value corresponding to an integration over the spreading code length. The output value of the second integrator I2 corresponds to the expectation value E(X) of the despread sample signal. As the total integration performed by the first integrator I1 and the second integrator I2 corresponds to an integration over the whole spreading code length of the control channel, the output of the integrator I2 can be used as a control symbol output at which the control symbols can be obtained in order to be used e.g. by the power control unit 6.

Furthermore, the output value of the second integrator I2 is supplied to a second squaring unit Q2 for generating an output value corresponding to a square of the absolute value of the expectation value E(X). The output value of the second squaring unit Q2 is supplied to a multiplier M2 arranged for multiplying the output value of the second squaring unit Q2 by a value (−1) and for supplying the result of the multiplication to an adding unit A1. The adding unit A1 is arranged to add the output value of the third integrator I3, i.e. the value E(|X|²) to the multiplication result of the multiplier M2. Thus, the output value of the adding unit A1 corresponds to the interference estimate I(i) for a control symbol i.

Finally, the output value obtained from the adding unit A1 is supplied to a fourth integrator I4 which performs an integration over the time period Ncτ corresponding to a TPC control interval, wherein N denotes the number of averaged symbols of the TPC control interval. Again, a switch is provided at the output of the integrator I4 so as to perform a sample operation at the timing t+Ncτ.

In summary, the processing performed by the first integrator I1 corresponds to the above equation (1). Furthermore, the processing performed by the first and second integrators I2 and I3, the first and second squaring units Q1 and Q2, the multiplier M2, and the adding unit A1 corresponds to the above equation (3) in combination with the above equations (4) and (5).

Furthermore, it is noted that processing performed by the multiplier M2 and the adding unit A1 corresponds to a subtracting operation, such that the units M2 and A1 could be replaced by a single subtracting unit.

Finally, the processing performed by the fourth integrator I4 corresponds to the above equation (6).

Since the interference estimation according to the preferred embodiment is based on despread samples derived from an orthogonal code period, e.g. the shortest code period provided in all spreading codes, a high accuracy can be obtained compared to an estimation based on the symbol level. Moreover, a proper consideration of orthogonality can be assured. Furthermore, the interference estimation is unbiased even if the channel is fading very fast.

To summarize, the present invention relates to a method and apparatus for performing an interference estimation in a spread spectrum system using a plurality of spreading codes with different code lengths, wherein the interference estimate is obtained based on an unbiased interference estimate of despread samples integrated over a predetermined code period over which said plurality of spreading codes are orthogonal. Thereby, an interference estimation with high accuracy and proper consideration of code orthogonality can be obtained.

It is noted that the above interference estimation method and apparatus described in the preferred embodiment can be applied in any communication network using a plurality of spreading codes. The above description of the preferred embodiment and the accompanying drawings are only intended to illustrate the present invention. The suggested MVU interference estimation can be replaced by any estimation suitable for deriving a interference estimate of the despread code samples. The preferred embodiment of the invention may thus vary within the scope of the attached claims.

The invention claimed is:

1. A method for performing an interference estimation in a spread spectrum system using a plurality of spreading codes with different code lengths, comprising the steps of:
   a) receiving a spread spectrum signal;
   b) generating a despread sample signal by averaging over a predetermined code period over which said plurality of spreading codes are orthogonal;
   c) calculating a variance estimate based on said despread sample signal; wherein said variance estimate is calculated by:
      integrating said despread sample signal over a spreading code length of said received spread spectrum signal;
      integrating a signal corresponding to a power of said despread sample signal over said plurality of spreading code lengths; and
      subtracting a signal obtained by squaring an output signal of said integration of said despread sample signal from an output signal of said integration of the signal corresponding to the power of said despread signal.

2. The method according to claim 1, wherein said variance estimate is calculated by averaging said despread sample signal over a spreading code length of said received spread spectrum signal.

3. The method according to claim 2, wherein said variance estimate is a minimum variance unbiased (MVU), calculated in accordance with a relationship:

$$\hat{\sigma}^2 = E(|X|^2) - E(X)|^2;$$

wherein $\hat{\sigma}^2$ denotes said variance estimate for a symbol i of said received spread spectrum signal, X denotes said despread sample signal, E(X) denotes an expectation value for said despread sample signal, and $E(|X|^2)$ denotes a mean power of said despread samples signal.

4. The method according to claim 2, wherein said spread spectrum system is a WCDMA system.

5. The method according to claim 1, wherein said predetermined code period corresponds to the length of the shortest code of said plurality of spreading codes.

6. The method according to claim 5, wherein said variance estimate is a minimum variance unbiased (MVU), calculated in accordance with a relationship:

$$\hat{\sigma}^2 = E(|X|^2) - |E(X)|^2;$$

wherein $\hat{\sigma}^2$ denotes said variance estimate for a symbol i of said received spread spectrum signal, X denotes said despread sample signal, E(X) denotes an expectation value for said despread sample signal, and $E(|X|^2)$ denotes a mean power of said despread samples signal.

7. The method according to claim 5, wherein said spread spectrum system is a WCDMA system.

8. The method according to claim 1, wherein said spread spectrum system is a WCDMA system.

9. A method for performing an interference estimation in a spread spectrum system using a plurality of spreading codes with different code lengths, comprising the steps of:
   a) receiving a spread spectrum signal;
   b) generating a despread sample signal by averaging over a predetermined code period over which said plurality of spreading codes are orthogonal; and
   c) calculating a variance estimate based on said despread sample signal;
   wherein said variance estimate is a minimum variance unbiased (MVU), calculated in accordance with a relationship:

$$\hat{\sigma}^2 = E(|X|^2) - |E(X)|^2;$$

wherein $\hat{\sigma}^2$ denotes said variance estimate for a symbol i of said received spread spectrum signal, X denotes said despread sample signal, E(X) denotes an expectation value for said despread sample signal, and $E(|X|^2)$ denotes a mean power of said despread sample signal; and wherein said despread sample signal is generated based on a relationship:

$$X(n) = \frac{1}{m}\sum_{k=1}^{m} r(k);$$

wherein m denotes a number of chips of said predetermined code period, k denotes a chip index of a spreading code of said received spread spectrum signal, r(k) denotes a value of a signal, obtained by removing said spreading code from said received spread spectrum signal, at said chip index k, and X(n) denotes the value of said despread sample signal at a sample index n.

10. The method according to claim 9, wherein said expectation value is obtained based on a relationship:

$$E(X) = \frac{1}{c/m} \sum_{n=1}^{c/m} X(n);$$

wherein c is a value proportional to a spreading code length of said received spread spectrum signal, m denotes a number of chips of said predetermined code period and is a value proportional to a minimum spreading code length, n denotes a sample index of said despread sample signal, and X(n) denotes a value of said despread sample signal at the sample index n.

11. The method according to claim 9, wherein said mean power of said despread sample signal is obtained based on a relationship:

$$E(|X|^2) = \frac{1}{c/m} \sum_{n=1}^{c/m} |X(n)|^2;$$

wherein c is a value proportional to a spreading code length of said received spread spectrum signal, m denotes a number of chips of said predetermined code period and is a value proportional to a minimum spreading code length, n denotes a sample index of said despread sample signal, and X(n) denotes a value of said despread sample signal at the sample index n.

12. The method according to claim 9, wherein the interference estimate is obtained based on a relationship:

$$\hat{I} = m\frac{c+m}{c} \cdot \frac{1}{N} \sum_{i=1}^{N} I(i);$$

wherein $\hat{I}$ denotes said interference estimate, c is a value proportional to a spreading code length of said received spread spectrum signal, m denotes a number of chips of said predetermined code period and is a value proportional to a minimum spreading code length, N denotes a number of averaged symbols of said received spread spectrum signal, for which said variance estimation is performed.

13. The method according to claim 9, wherein said spread spectrum system is a WCDMA system.

14. A method for performing an interference estimation in a spread spectrum system using a plurality of spreading codes with different code lengths, comprising the steps of:
 a) receiving a spread spectrum signal;
 b) generating a despread sample signal by averaging over a predetermined code period over which said plurality of spreading codes are orthogonal; and
 c) calculating a variance estimate based on said despread sample signal;
 wherein said variance estimate is a minimum variance unbiased (MVU), calculated in accordance with a relationship:

$$\hat{\sigma}^2 = E(|X|^2) - |E(X)|^2;$$

wherein $\hat{\sigma}^2$ denotes said variance estimate for a symbol i of said received spread spectrum signal, X denotes said despread sample signal, E(X) denotes an expectation value for said despread sample signal, and $E(|X|^2)$ denotes a mean power of said despread sample signal; and wherein said expectation value is obtained based on a relationship:

$$E(X) = \frac{1}{c/m} \sum_{n=1}^{c/m} X(n);$$

wherein c is a value proportional to a spreading code length of said received spread spectrum signal, m denotes a number of chips of said predetermined code period and is a value proportional to a minimum spreading code length, n denotes a sample index of said despread sample signal, and X(n) denotes a value of said despread sample signal at the sample index n.

15. The method according to claim 14, wherein said mean power of said despread sample signal is obtained based on a relationship:

$$E(|X|^2) = \frac{1}{c/m} \sum_{n=1}^{c/m} |X(n)|^2;$$

wherein c is a value proportional to a spreading code length of said received spread spectrum signal, m denotes a number of chips of said predetermined code period and is a value proportional to a minimum spreading code length, n denotes a sample index of said despread sample signal, and X(n) denotes a value of said despread sample signal at the sample index n.

16. The method according to claim 14, wherein the interference estimate is obtained based on a relationship:

$$\hat{I} = m\frac{c+m}{c} \cdot \frac{1}{N} \sum_{i=1}^{N} I(i);$$

wherein $\hat{I}$ denotes said interference estimate, c is a value proportional to a spreading code length of said received spread spectrum signal, m denotes a number of chips of said predetermined code period and is a value proportional to a minimum spreading code length, N denotes a number of averaged symbols of said received spread spectrum signal, for which said variance estimation is performed.

17. The method according to claim 14, wherein said spread spectrum system is a WCDMA system.

18. A method for performing an interference estimation in a spread spectrum system using a plurality of spreading codes with different code lengths, comprising the steps of:
 a) receiving a spread spectrum signal;
 b) generating a despread sample signal by averaging over a predetermined code period over which said plurality of spreading codes are orthogonal; and
 c) calculating a variance estimate based on said despread sample signal;

wherein said variance estimate is a minimum variance unbiased (MVU), calculated in accordance with a relationship:

$$\hat{\sigma}^2 = E(|X|^2) - |E(X)|^2;$$

wherein $\hat{\sigma}^2$ denotes said variance estimate for a symbol i of said received spread spectrum signal, X denotes said despread sample signal, E(X) denotes an expectation value for said despread sample signal, and $E(|X|^2)$ denotes a mean power of said despread sample signal; and wherein said mean power of said despread sample signal is obtained based on a relationship:

$$E(|X|^2) = \frac{1}{c/m} \sum_{n=1}^{c/m} |X(n)|^2;$$

wherein c is a value proportional to a spreading code length of said received spread spectrum signal, m denotes a number of chips of said predetermined code period and is a value proportional to a minimum spreading code length, n denotes a sample index of said despread sample signal, and X(n) denotes a value of said despread sample signal at the sample index n.

19. The method according to claim 18, wherein the interference estimate is obtained based on a relationship:

$$\hat{I} = m \frac{c+m}{c} \cdot \frac{1}{N} \sum_{i=1}^{N} I(i);$$

wherein $\hat{I}$ denotes said interference estimate, m denotes a number of chips of said predetermined code period, N denotes a number of averaged symbols of said received spread spectrum signal, for which said variance estimation is performed.

20. The method according to claim 18, wherein said spread spectrum system is a WCDMA system.

21. A method for performing an interference estimation in a spread spectrum system using a plurality of spreading codes with different code lengths, comprising the steps of:
    a) receiving a spread spectrum signal;
    b) generating a despread sample signal by averaging over a predetermined code period over which said plurality of spreading codes are orthogonal; and
    c) calculating a variance estimate based on said despread sample signal;

wherein said variance estimate is a minimum variance unbiased (MVU), calculated in accordance with a relationship:

$$\hat{\sigma}^2 = E(|X|^2) - E(X)|^2;$$

wherein $\hat{\sigma}^2$ denotes said variance estimate for a symbol i of said received spread spectrum signal, X denotes said despread sample signal, E(X) denotes an expectation value for said despread sample signal, and $E(|X|^2)$ denotes a mean power of said despread sample signal; and wherein the interference estimate is obtained based on a relationship:

$$\hat{I} = m \frac{c+m}{c} \cdot \frac{1}{N} \sum_{i=1}^{N} I(i);$$

wherein $\hat{I}$ denotes said interference estimate, c is a value proportional to a spreading code length of said received spread spectrum signal, m denotes a number of chips of said predetermined code period and is a value proportional to a minimum spreading code length, N denotes a number of averaged symbols of said received spread spectrum signal, for which said variance estimation is performed.

22. The method according to claim 21, wherein said spread spectrum system is a WCDMA system.

23. An apparatus for performing an interference estimation in a spread spectrum system using a plurality of spreading codes with different code lengths comprising:
    a) receiving means for receiving a spread spectrum signal;
    b) sampling means for generating a despread sample signal by averaging over a predetermined code period over which said plurality of spreading codes are orthogonal; and
    c) estimation means for obtaining a variance estimate based on said despread sample signal;
    wherein said estimation means comprises a first integration means for integrating said despread sample signal over a spreading code length of said received spread spectrum signal, a second integration means for integrating a signal corresponding to a power of said despread sample signal over said spreading code length, and subtracting means for subtracting a signal obtained by squaring an output signal of said first integrating means from an output signal of said second integrating means, wherein said estimation means comprises an averaging means for averaging an output signal of said subtracting means over a predetermined number of symbols of said received spread spectrum signal.

24. The apparatus according to claim 23, wherein said predetermined code period corresponds to a length of a shortest spreading code of said plurality of spreading codes.

25. The apparatus according to claim 24, wherein said sampling mean comprises an integrating means for integrating a signal, obtained by removing a spreading code from said received spread spectrum signal, over said predetermined code period.

26. The apparatus according to claim 24, wherein said estimation means comprises a first integration means for integrating said despread sample signal over a spreading code length of said received spread spectrum signal, a second integration means for integrating a signal corresponding to a power of said despread sample signal over said spreading code length, and subtracting means for subtracting a signal obtained by squaring an output signal of said first integrating in cans from an output signal of said second integrating means.

27. The apparatus according to claim 24, wherein said estimation means comprises an averaging means for averaging an output signal of said subtracting means over a predetermined number of symbols of said received spread spectrum signal.

28. The apparatus according to claim 24, wherein said interference estimation apparatus is an SIR estimator for performing power control in a spread spectrum transceiver.

29. The apparatus according to claim 24, wherein said spread spectrum system is a WCDMA system.

30. The apparatus according to claim 23, wherein said sampling means comprises an integrating means for integrating a signal, obtained by removing a spreading code from said received spread spectrum signal, over said predetermined code period.

31. The apparatus according to claim 30, wherein said estimation means comprises a first integration means for integrating said despread sample signal over a spreading code length of said received spread spectrum signal, a second integration means for integrating a signal corresponding to a power of said despread sample signal over said spreading code length, and subtracting means for subtracting a signal obtained by squaring an output signal of said first integrating means from an output signal of said second integrating means.

32. The apparatus according to claim 30, wherein said estimation means comprises an averaging means for averaging an output signal of said subtracting means over a predetermined number of symbols of said received spread spectrum signal.

33. The apparatus according to claim 30, wherein said interference estimation apparatus is an SIR estimator for performing power control in a spread spectrum transceiver.

34. The apparatus according to claim 30, wherein said spread spectrum system is a WCDMA system.

35. The apparatus according to claim 23, wherein said averaging means comprises an integrating means.

36. The apparatus according to claim 35, wherein said interference estimation apparatus is an SIR estimator for performing power control in a spread spectrum transceiver.

37. The apparatus according to claim 35, wherein said spread spectrum system is a WCDMA system.

38. The apparatus according to claim 23, wherein said averaging means comprises a digital filter.

39. The apparatus according to claim 38, wherein said interference estimation apparatus is an SIR estimator for performing power control in a spread spectrum transceiver.

40. The apparatus according to claim 38, wherein said spread spectrum system is a WCDMA system.

41. The apparatus according to claim 23, wherein said interference estimation apparatus is an SIR estimator used for performing power control in a spread spectrum transceiver.

42. The apparatus according to claim 41, wherein said spread spectrum system is a WCDMA system.

43. The apparatus according to claim 23, wherein said spread spectrum system is a WCDMA system.

44. The apparatus according to claim 23, wherein said interference estimation apparatus is an SIR estimator for performing power control in a spread spectrum transceiver.

45. The apparatus according to claim 23, wherein said spread spectrum system is a WCDMA system.

* * * * *